United States Patent [19]

McBrien et al.

[11] Patent Number: 5,069,071
[45] Date of Patent: Dec. 3, 1991

[54] VIBRATION MONITORING IN THE FREQUENCY DOMAIN WITH A CAPACITIVE ACCELEROMETER

[75] Inventors: Gregory J. McBrien, Cromwell; Anthony N. Martin, Simsbury; Douglas P. Modeen, Granby, all of

[73] Assignee: United Technologies Corporation, Hartford, Conn.

[21] Appl. No.: 572,838

[22] Filed: Aug. 27, 1990

[51] Int. Cl.⁵ .................. G01H 11/06; G01P 15/125
[52] U.S. Cl. ...................................... 73/654; 73/652; 73/659; 73/579; 73/583
[58] Field of Search .......... 73/652, 654, 659, 517 AV, 73/579, 583

[56] References Cited

U.S. PATENT DOCUMENTS

| | | | |
|---|---|---|---|
| 4,206,400 | 6/1980 | Holdren et al. | 324/61 R |
| 4,435,737 | 3/1984 | Colton | 361/280 |
| 4,694,687 | 9/1987 | Bonin et al. | 73/116 |
| 4,928,203 | 5/1990 | Swindal et al. | 361/280 |
| 4,930,042 | 5/1990 | Wiegand et al. | 361/280 |
| 4,930,043 | 5/1990 | Wiegand | 361/280 |

OTHER PUBLICATIONS

Tibor L. Foldvari and Kurt S. Lion, "Capacitive Trasducers", *Instruments and Control Systems*, Nov. 1977.

*Primary Examiner*—Hezron Williams
*Assistant Examiner*—W. Francos

[57] ABSTRACT

A vibration monitoring system employing a capacitive accelerometer determines the energy associated with one or more frequency components within the frequency spectrum of the vibration signal. The capacitive accelerometer operates as a mixer due to its time varying capacitance which provides a measure of the vibration. When the accelerometer is excited by an AC signal the output from the accelerometer comprises beat frequencies due to the mixing of the time varying capacitance and the AC signal. By changing the frequency of the AC signal the location of the beat frequencies in the frequency domain of the accelerometer output can be shifted. Subsequent bandpass filtering to attenuate frequencies except those associated with the frequency component and demodulation to bandshift the energy of the filtered signal energy to DC, creates a DC value which provides a measure of the energy present at the frequency component.

23 Claims, 7 Drawing Sheets

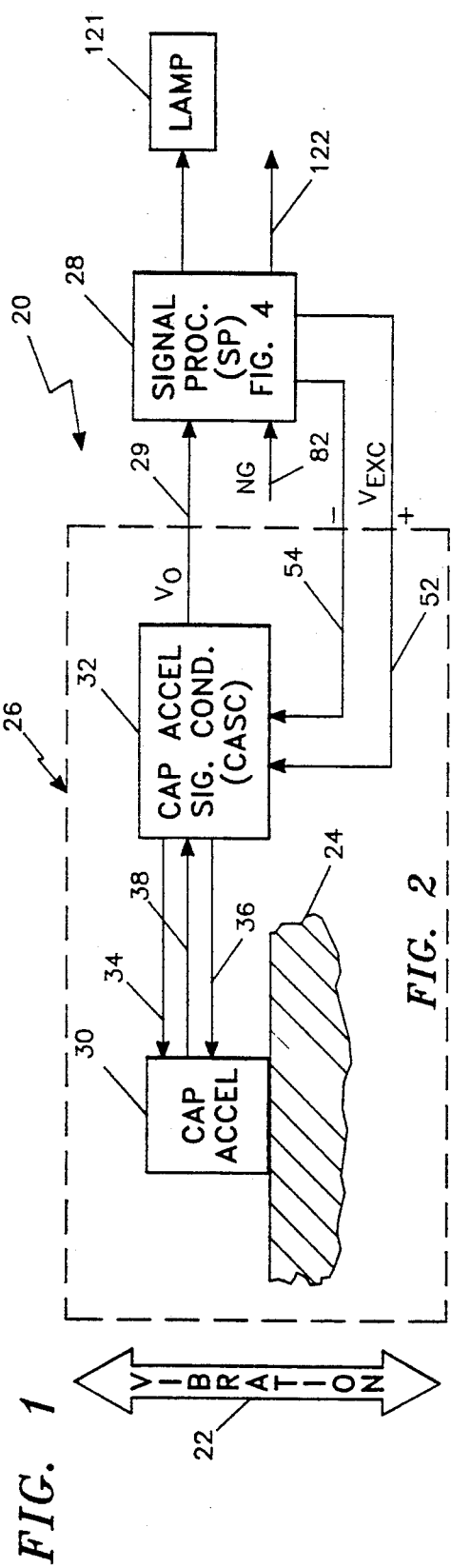
FIG. 1
FIG. 2
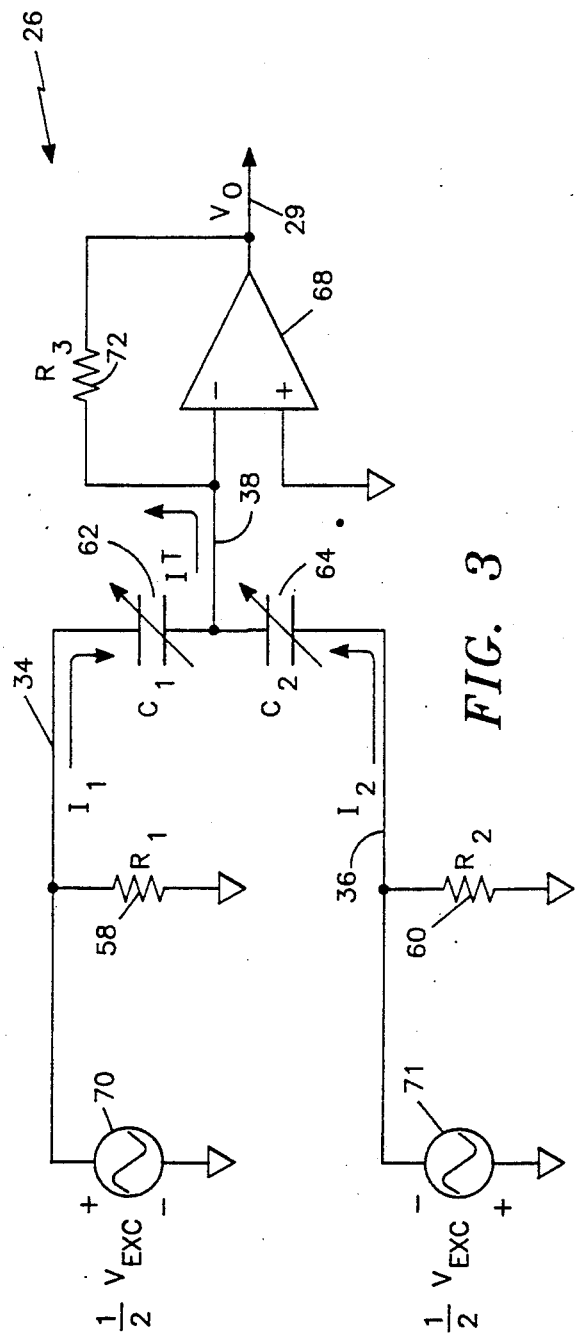
FIG. 3

VIBRATION MONITORING IN THE FREQUENCY DOMAIN WITH A CAPACITIVE ACCELEROMETER

DESCRIPTION

1. Technical Field

This invention relates to vibration monitoring systems, and more particularly to such systems using a capacitive accelerometer to detect vibration.

2. Background Art

Vibration monitoring systems are used in many industrial, commercial and military systems. Their usage includes, e.g., diagnostic evaluation of mechanical systems in product development, and failure monitoring/trend analysis of rotating turbomachinery in military and commercial gas turbine engines. In the case of aircraft gas turbine engines, as more maintenance activities become scheduled based upon computerized trend analysis of each particular engine, automated in-flight vibration monitoring will become more desirable to facilitate maintenance reporting. The vibration monitoring system records sufficient data in order to detect and diagnose engine anomalies which manifest themselves in vibration, thus reducing the number of unscheduled engine removals.

The most widely used accelerometer is the piezoelectric accelerometer which comprises a crystalline material that generates a charge, q, when force is applied. When an accelerating mass is brought into direct contact with the crystalline material the charge q is a measure of the acceleration the mass is undergoing. When the mass is vibrating a varying force is applied to the crystalline material thereby producing a varying charge q indicative of the vibration. A charge amplifier within the accelerometer then produces an electrical signal proportional to the amount of charge generated by the piezoelectric force effect. This electrical signal is a measure of vibration.

The electrical signal is processed to determine the energy located in various parts of the vibration frequency spectrum. This may be performed by sampling the electrical signal consistent with the Nyguist criteria in order to avoid aliasing problems, and then performing a Fast Fourier Transform (FFT) to determine the dominant frequencies present in the vibration spectrum along with the energy associated with the dominant frequencies.

Determining the energy located in various parts of the vibration frequency spectrum may also be performed using a plurality of filters with different passbands such that each filter provides a signal whose energy is indicative of the frequency component within its passband. This may also be performed by using a single tunable filter whose passband can be shifted within a certain range of frequencies, thus allowing this one tunable filter to measure the energy associated with a plurality of frequency components.

Several problems exist with these approaches. The piezoelectric accelerometer has a high impedance output which produces many problems well known to designers when the accelerometer has to work in a harsh environment, e.g., an aircraft gas turbine engine. Another problem is the hardware intensive requirements necessary to perform the signal processing of the accelerometer's electrical output signal. The most noticeable being the hardware necessary to perform the FFT; e.g., a microprocessor such as the Intel model 80186 or a digital signal processing (DSP) chip such as the Texas Instruments TMS32020. In addition to hardware costs of these parts, software must be written for their proper operation. While an obvious problem with the plurality of bandpass filters is the additional hardware requirements and its effect on system reliability.

DISCLOSURE OF INVENTION

An object of the present invention is to provide a capacitive accelerometer which operates as a mixer when excited by a variable frequency AC excitation signal and along with its associated signal conditioning and processing circuitry produces a signal indicative of vibration which is processed to determine the magnitude of the energy at a certain frequency within the frequency spectrum of the signal.

According to the present invention, a vibration monitoring system comprising a capacitive accelerometer mounted to or rigidly coupled to a mass operates as both a sensor and a mixer, the accelerometer varies its capacitance as a function of the vibration producing a time varying capacitance signal indicative thereof, the time varying capacitance signal is mixed with a variable frequency AC excitation signal, thereby producing beat frequencies indicative of the energy within the vibration signal spectrum which are processed to determine the amount of energy at a frequency component selected from within a vibration frequency range of interest and associated with a beat frequency.

Employing a capacitive accelerometer as both a sensor and a mixer reduces the amount of circuitry required to perform vibration monitoring in a realtime system. Such a circuitry reduction is especially beneficial in weight and size critical applications such as gas turbine engine mounted vibration monitoring systems for commercial and military aircraft. Furthermore, remote electronics are made possible by the object of this invention allowing the sensor to be used in high temperature environments while the low impedance of the sensor offers Electromagnetic Interference (EMI) immunity.

According to another aspect of the present invention, referencing the variable frequency AC excitation signal to a base frequency (e.g., turbine engine speed) allows the vibration information to be "tracked" against the base frequency.

These and other objects, features and advantages of the present invention will become more apparent in light of the following detailed description of an exemplary embodiment thereof as illustrated in the accompanying drawings.

BRIEF DESCRIPTION OF THE DRAWING

FIG. 1 is system block diagram of a vibration monitoring system in accordance with the present invention;

FIG. 3 is an illustration of an equivalent circuit for the vibration sensor of FIG. 2;

BEST MODE FOR CARRYING OUT THE INVENTION

Figure 2:
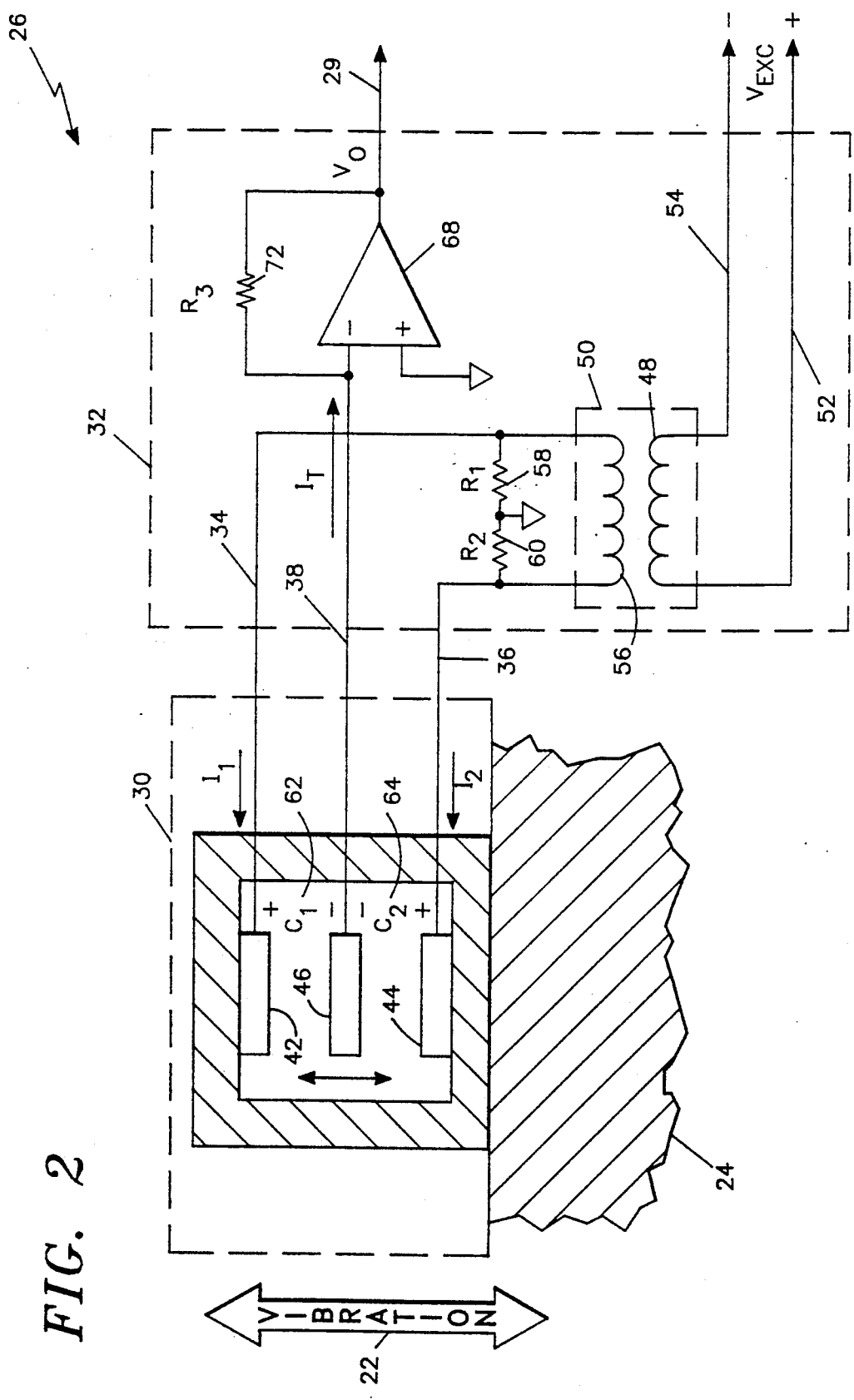
FIG. 2 is an illustration of a vibration sensor as employed in the vibration monitoring system of FIG. 1.

Referring to FIG. 1, a vibration monitoring system 20 is designed to detect the frequency and magnitude of a vibration 22 on a mass 24, e.g., a fan casing of an aircraft gas turbine engine. The vibration monitoring system 20 comprises two main components: a vibration sensor 26 and a signal processor (SP) 28. The vibration sensor 26 detects the vibration and provides a signal $V_o$ indicative thereof on a line 29 to the signal processor 28.

The vibration sensor 26 comprises a capacitive accelerometer 30 and a capacitive accelerometer signal conditioner (CASC) 32. The vibration 22 acts upon and is detected by the accelerometer 30 which operates as both a sensor and a mixer by internally mixing (i.e., multiplying) a sensed vibration signal which is a time varying change of capacitance indicative of the vibration, with an AC excitation signal provided on lines 34,36 from the CASC 32. The mixing produces a mixed signal on a line 38. The utility of the mixing operation will be discussed hereinafter in greater detail.

In FIG. 2 is illustrated a more detailed representation of the vibration sensor 26. The accelerometer 30 comprises three conductive plates which detect the vibration and create the sensed vibration signal as a change in capacitance. U.S. Pat. Nos. 4,928,203, 4,930,042 and 4,930,043 assigned to the assignee of the present invention illustrate such a capacitive accelerometer and are hereby incorporated by reference. A top plate 42 and a bottom plate 44 are in fixed positions while a center plate 46, also referred to as a proof mass, moves up and down as a function of the vibration 22. As the center plate 46 moves up it increases the capacitance between itself and the top plate 42 while decreasing the capacitance between itself and the bottom plate 44. Conversely, as the center plates moves down, the capacitance between itself and the bottom plate increases while decreasing the capacitance between itself and the top plate.

As illustrated in FIG. 1, a variable frequency AC excitation signal $V_{exc}$ is applied to the CASC 32 from the SP 28 on lines 52,54. Within the CASC as illustrated in FIG. 2, $V_{exc}$ is applied to a primary coil 48 of a transformer 50 via the lines 52,54. This causes a current through the primary coil 48, thereby inducing a voltage and current in a secondary coil 56 of the transformer 50. Assume the turns ratio of the transformer is one to one, (i.e., the number of coil turns in the primary is equal to the number in the secondary) and a resistor $R_1$ 58 equals a resistor $R_2$ 60. Also let a capacitor $C_1$ 62 represent the capacitance between the upper and center plates 42,46 and a capacitor $C_2$ 64 represent the capacitance between the center and lower plate 46,44. $I_1$ represents current on the line 34 while $I_2$ represents current on the line 36.

If the center plate 46 moves up $C_1$ increases capacitance, thereby increasing $I_1$. This also causes $C_2$ to decrease its capacitance, thereby decreasing the magnitude of $I_2$. $I_1$ and $I_2$ are combined to create the mixed signal, $I_T$, on the line 38 and produce the voltage $V_o$ at the output of an operational amplifier (op-amp) 68 (e.g., National Semiconductor model LM147) on the line 29, where $V_o = R_3 * I_T$ and $I_T$ is the current through a resistor $R_3$ 72.

The operation of the vibration sensor 26 can be better understood by illustrating its equivalent circuit representation in FIG. 3. The transformer 50 has been replaced by two voltage sources 70,71 and the capacitive accelerometer replaced by two variable capacitors 62,64. Current on the line 38 is created by summing the current on the line 34, and the line 36. The current on the line 34 can be written as:

$$I_1 = d/dt(\tfrac{1}{2}V_{exc} * C_1) \qquad \text{(eq. 1)}$$

While current on the line 36 can be written as:

$$I_2 = d/dt(-\tfrac{1}{2}V_{exc} * C_2) \qquad \text{(eq. 2)}$$

Summing these currents yields the mixed signal, $I_T$, defined as:

$$I_T = I_1 + I_2 \qquad \text{(eq. 3)}$$

Substituting eq. 1 and 2 into eq. 3 yields:

$$I_T = d/dt(\tfrac{1}{2}V_{exc} * C_1) + d/dt(-\tfrac{1}{2}V_{exc} * C_2) \qquad \text{(eq. 4)}$$

where capacitors $C_1$ 62 and $C_2$ 64 which create the sensed vibration signal and change capacitance as a function of vibration can be defined as:

$$C_1 = (C_{nom} + c) \qquad \text{(eq. 5)}$$

$$C_2 = (C_{nom} - c) \qquad \text{(eq. 6)}$$

where $C_{nom}$ is the nominal capacitance of $C_1$ and $C_2$ when no vibration is acting upon the center plate 46 of the capacitive accelerometer 30, and c is the sensed vibration signal which is a time varying change of capacitance due to the vibration acting on the center plate.

Substituting eq. 5 and eq. 6 into eq. 4 and cancelling terms yields:

$$I_T = d/dt(V_{exc} * c) \qquad \text{(eq. 7)}$$

where $V_{exc}$ can be expressed as:

$$V_{exc} = A * \cos(w_c * t) \qquad \text{(eq. 8)}$$

and the sensed vibration signal, c, can be expressed as:

$$c = C_{max} * \cos(w_s * t) \qquad \text{(eq. 9)}$$

The frequency terms $w_c$ and $w_s$ represent the frequency of $V_{exc}$, and a frequency component present in the sensed vibration signal respectively. A is the peak voltage magnitude for $V_{exc}$ and $C_{max}$ is the maximum change of capacitance allowed by the capacitive accelerometer 30.

Substituting eq. 8 and eq. 9 into eq. 7 yields:

$$I_T = d/dt(A * \cos(w_c * t) * C_{max} * \cos(w_s * t)) \qquad \text{(eq. 10)}$$

Using a trigonometric identity allows the expression to be rewritten as:

$$I_T = A * C_{max} * d/dt(\tfrac{1}{2} * \cos(w_c - w_s) * t + \tfrac{1}{2} * \cos(w_c + w_s) * t) \quad \text{(eq. 11)}$$

Filtering of the signal so the high frequency $\cos(w_c + w_s) * t$ term can be discarded and subsequent differentiation yields an expression for the mixed signal:

$$I_T = A * C_{max} * \tfrac{1}{2} * (-\sin(w_c - w_s)t) \quad \text{(eq. 12)}$$

Equation 12 demonstrates the accelerometer's ability as a mixer and that the mixing produces beat frequencies in the mixed signal. The voltage output on the line 29 can be expressed as:

$$V_o = R_3 * I \quad \text{(eq. 13)}$$

Substituting eq. 12 into eq. 13 yields the final expression for the output of the vibration sensor 26 on the line 29:

$$V_o = -R_3 * A * C_{max} * \tfrac{1}{2} * (\sin(w_c - w_s)t) \quad \text{(eq. 14)}$$

The next operation of the vibration monitoring system 20 is to determine the energy associated with one or more of the frequency components within the vibration signal 22 by processing $V_o$.

Figure 4:
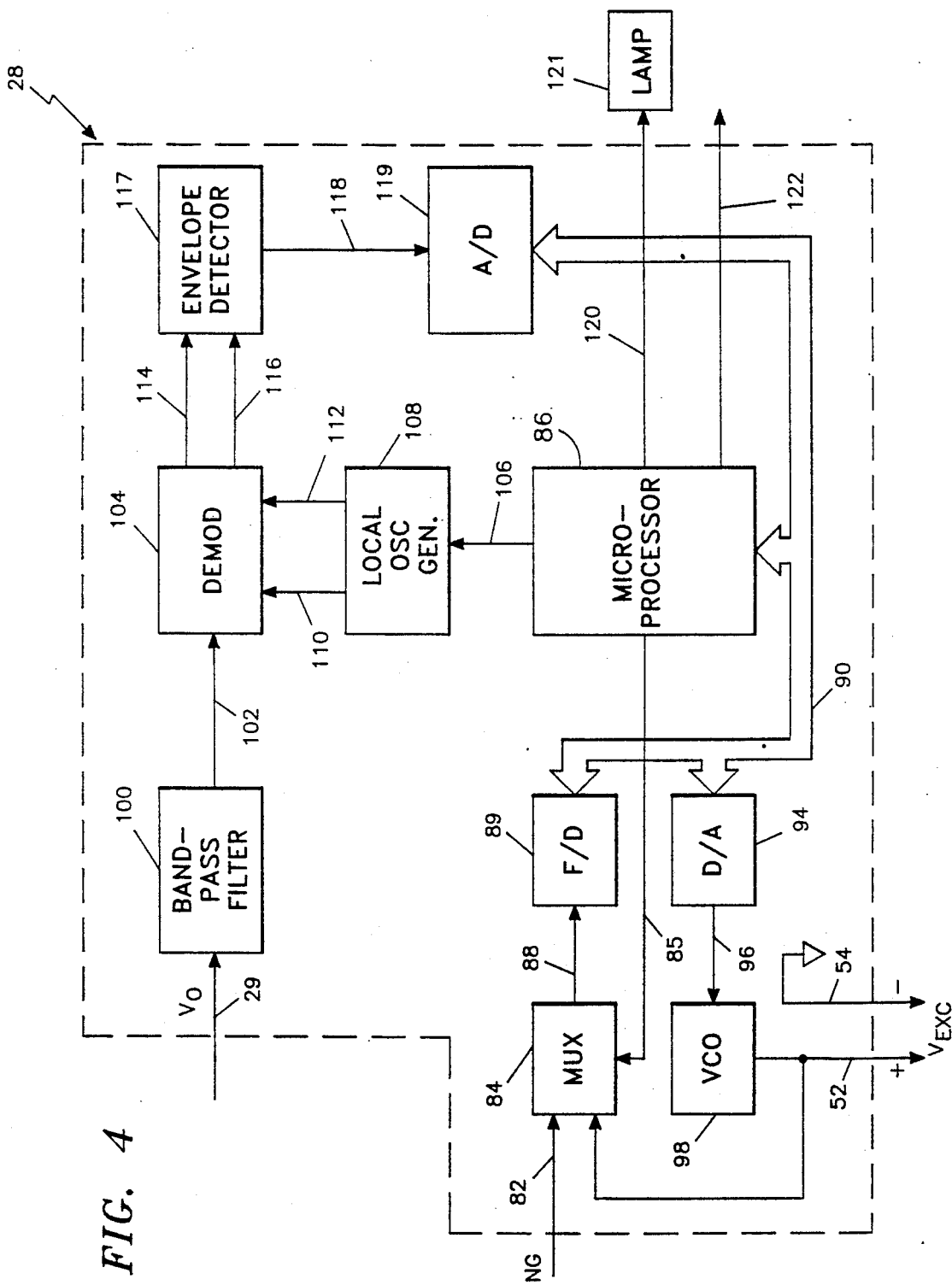
FIG. 4 is a block diagram of signal processor circuitry included in the vibration monitoring system of FIG. 1.

In FIG. 4 is illustrated the signal processor 28. An engine speed signal, e.g., NG, is input on a line 82 to a multiplexor (mux) 84. Under the control of a select line 85 from a microprocessor 86, the mux 84 presents a signal on a line 88 to a frequency-to-digital (F/D) converter 89. The F/D 89 converts the signal on the line 88 to a digital speed signal representative of engine speed and outputs the signal onto a bus 90. The microprocessor 86 uses this digital speed signal to select from a vibration frequency spectrum 91 a vibration frequency range of interest illustrated in FIG. 5 as the region bounded by a lower frequency bound 92 and a upper frequency bound 93.

As illustrated hereinbefore by eq. 14, if the frequency $w_c$ of $V_{exc}$ is changed, the frequency of the output signal $V_o$ will also change. This behavior can be utilized to determine the amount of energy associated with a frequency component within the vibration frequency range of interest.

To determine the energy associated with the frequency component, the microprocessor outputs a digital word indicative of the frequency component to a digital-to-analog (D/A) converter 94 via the bus 90. An analog DC voltage signal is then output on a line 96 to a voltage controlled oscillator (VCO) 98. The VCO sets the frequency $w_c$ of $V_{exc}$ output on lines 52,54 as a function of the analog DC voltage signal.

To ensure the VCO is providing $V_{exc}$ at the proper frequency, the signal on the line 52 is input to the mux 84 for selection to the F/D 89. The microprocessor can then check to ensure the VCO is providing the signal to the vibration sensor 26 within the desired tolerance.

Following the mixing, the vibration sensor output $V_o$ on the line 29 is input to a bandpass filter (BPF) 100 illustrated in FIG. 4. Bandpass filters are well known and their passband can be characterized by a center frequency, $w_{bpf}$, and a term defining the width of the passband on either side of the center frequency. The BPF output on a line 102 is then input to an asynchronous demodulator 104.

For the demodulation the microprocessor 86 provides a periodic squarewave signal on a line 106 to a local oscillator generator 108. This signal has a frequency equal to $w_{bpf}$. The local oscillator generator then filters and conditions the periodic squarewave signal to provide two sinusoidal reference signals operating at $w_{bpf}$ to the demodulator. A first sinusoidal signal, on a line 110, is phase shifted zero degrees from the signal on the line 106. A second sinusoidal signal, on a line 112, is phase shifted ninety degrees from the signal on the line 106. This allows the bandpass filtered signal on the line 102 to be alternately demodulated with the signal on the line 110 and the signal on the line 112 as the reference signal. The resulting demodulator output from each of these demodulations is provided on lines 114,116.

The signal on the line 114 corresponds to the demodulation performed with the reference signal shifted zero degrees, and the signal on the line 116 corresponds to demodulation with the reference signal phase shifted ninety degrees. The signals on the lines 114,116 are then input to an envelope detector/RSS circuit 117 which recovers the envelope of each signal, takes the root sum of the squares (i.e., the RSS) of the two signals and provides the resulting output on a line 118. The signal on the line 118 represents the energy present at the frequency component within the vibration frequency range of interest. An analog-to-digital converter (A/D) 119 then samples the signal on the line 118, and provides the microprocessor 86 a digital signal on the bus 90 indicative of the frequency component's energy.

The microprocessor uses the digital signal indicative of the frequency component's energy to determine if a critical failure resulting in excessive vibration exists. If such a failure does exist, the microprocessor outputs a signal on a line 120 to illuminate a lamp 121 in the aircraft cockpit for failure annunciation. Information from the vibration monitoring system may also be provided to the aircraft central maintenance computer and flight management system or similar avionics via a data link (e.g., ARINC 429, MIL-STD-1553 or RS-422) along a line 122.

Figure 6A:
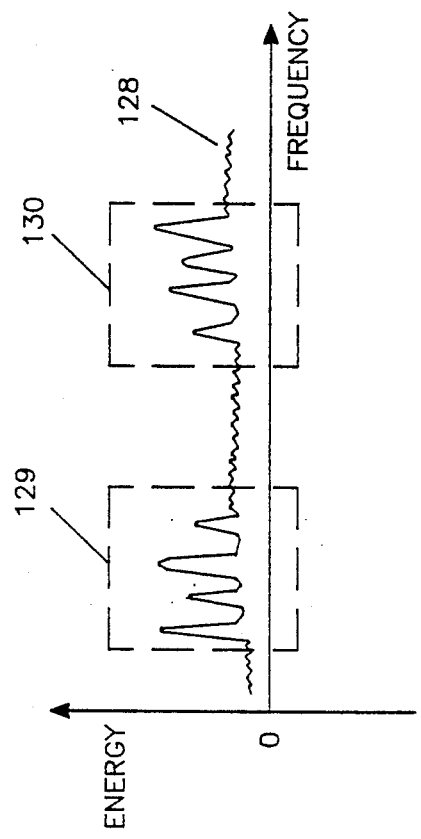
FIGS. 6A, 6B, 6C are illustrations of the time domain representation of the variable frequency AC excitation signal and the sensed vibration signal, along with the frequency domain representation of the resultant product from mixing these two signals.
Figure 6B:
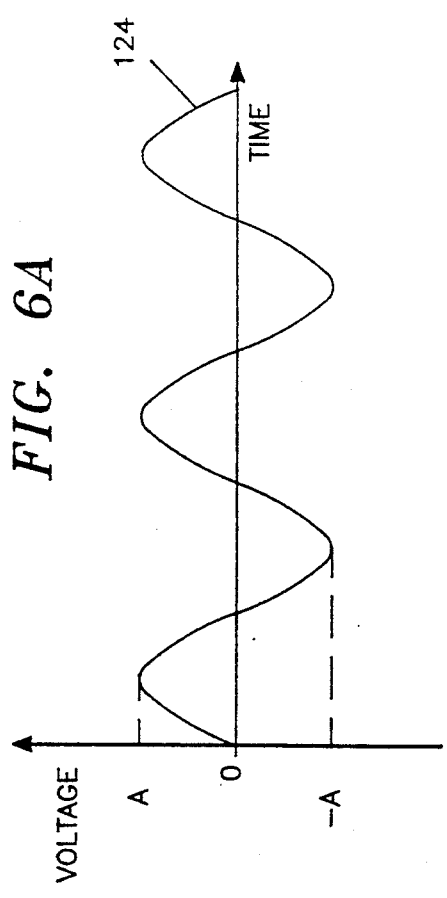
Figure 6C:
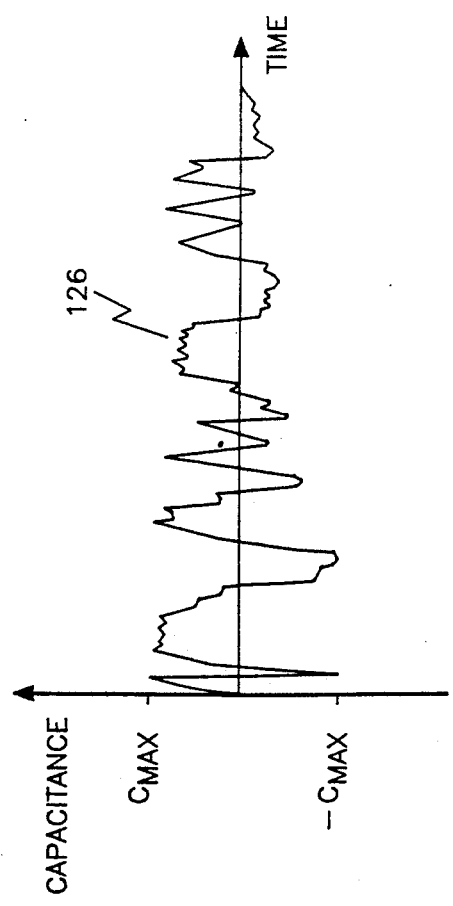

Illustrated in FIGS. 6A and 6B are the time domain representations of the variable frequency AC excitation signal $V_{exc}$ on the lines 52,54 and the sensed vibration signal. Waveform 124 (FIG. 6A) illustrates the variable frequency AC excitation signal. Waveform 126 (FIG. 6B) illustrates the sensed vibration signal. Mixing waveforms 124 and 126 together produces a signal whose frequency spectrum is waveform 128 (FIG. 6C) as illustrated in the frequency domain.

Waveform 124 comprises a single frequency component corresponding to the frequency $w_c$ of the variable frequency AC excitation signal, $V_{exc}$. Whereas waveform 126 contains a plurality of components indicative of the many vibration frequency components within the vibration 22. These components typically correspond to fan speed (N1), gas generator speed (NG), and rotating engine components and engine mounted accessories, e.g., gear box speed and fuel pump speed.

Due to the mixing of waveforms 124 and 126 the frequency spectrum of waveform 128 contains beat frequencies located at the difference and sum frequency components of the variable frequency AC excitation signal and the sensed vibration signal. When the frequency spectrum of the sensed vibration signal illustrated by waveform 126 contains four dominant frequency components, then waveform 128 will contain four dominant difference frequency terms 129 and four dominant sum frequency terms 130 which correspond to the four dominant frequency terms in waveform 126. As described hereinbefore the high frequency sum terms can be discarded since they contain identical information as the lower frequency difference terms and, thus, the remaining processing can be performed with the four difference terms. It should be understood that waveform 128 is not intended to be an all inclusive representation of the mixed signal on the line 29. Rather in the interest of clarity it illustrates only several sum and difference beat frequencies created by the mixing.

Figure 5:
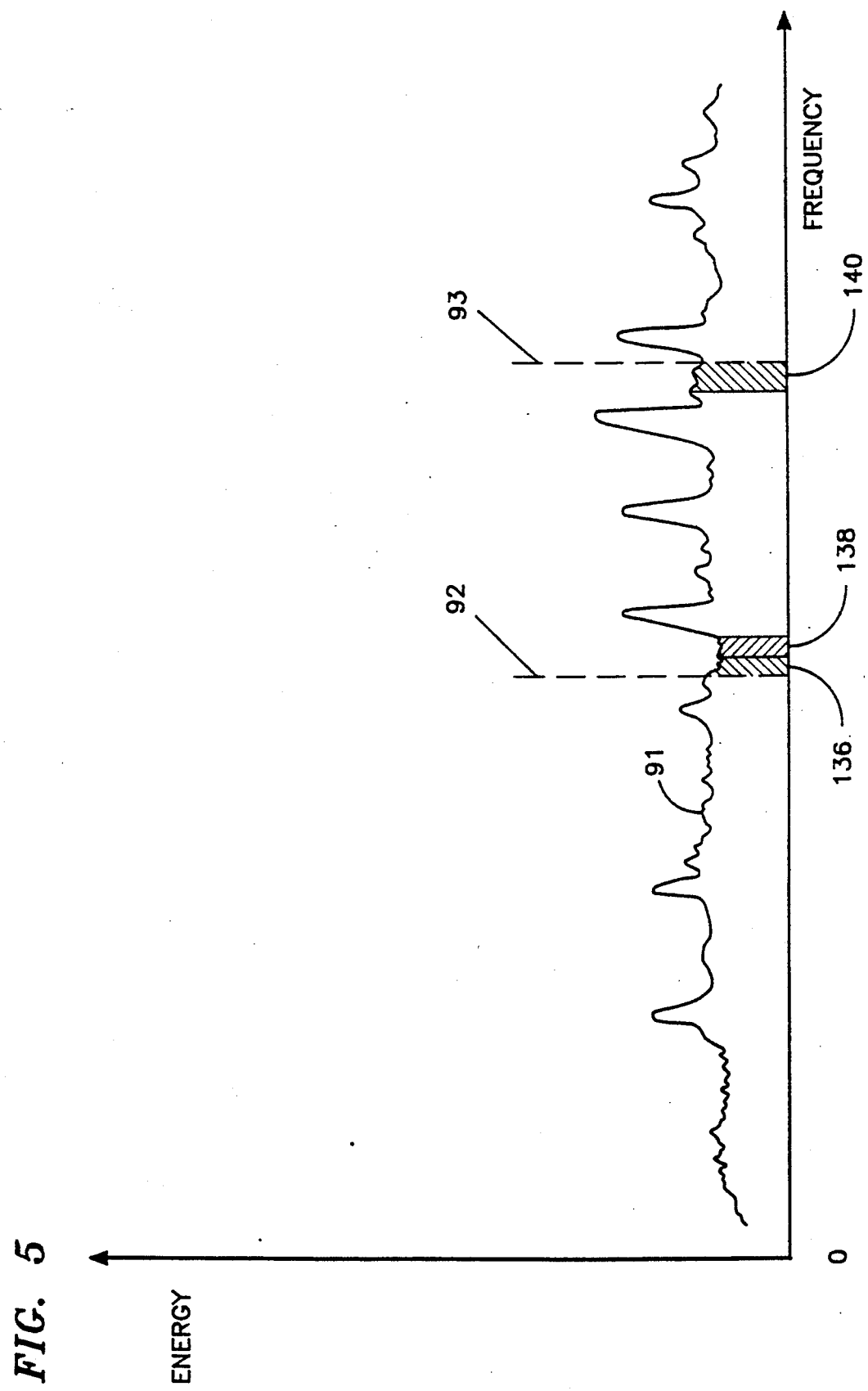
FIG. 5 is an illustration of the frequency spectrum of the vibrating mass and a portion of the spectrum selected as the frequency range of interest.
Figure 7:
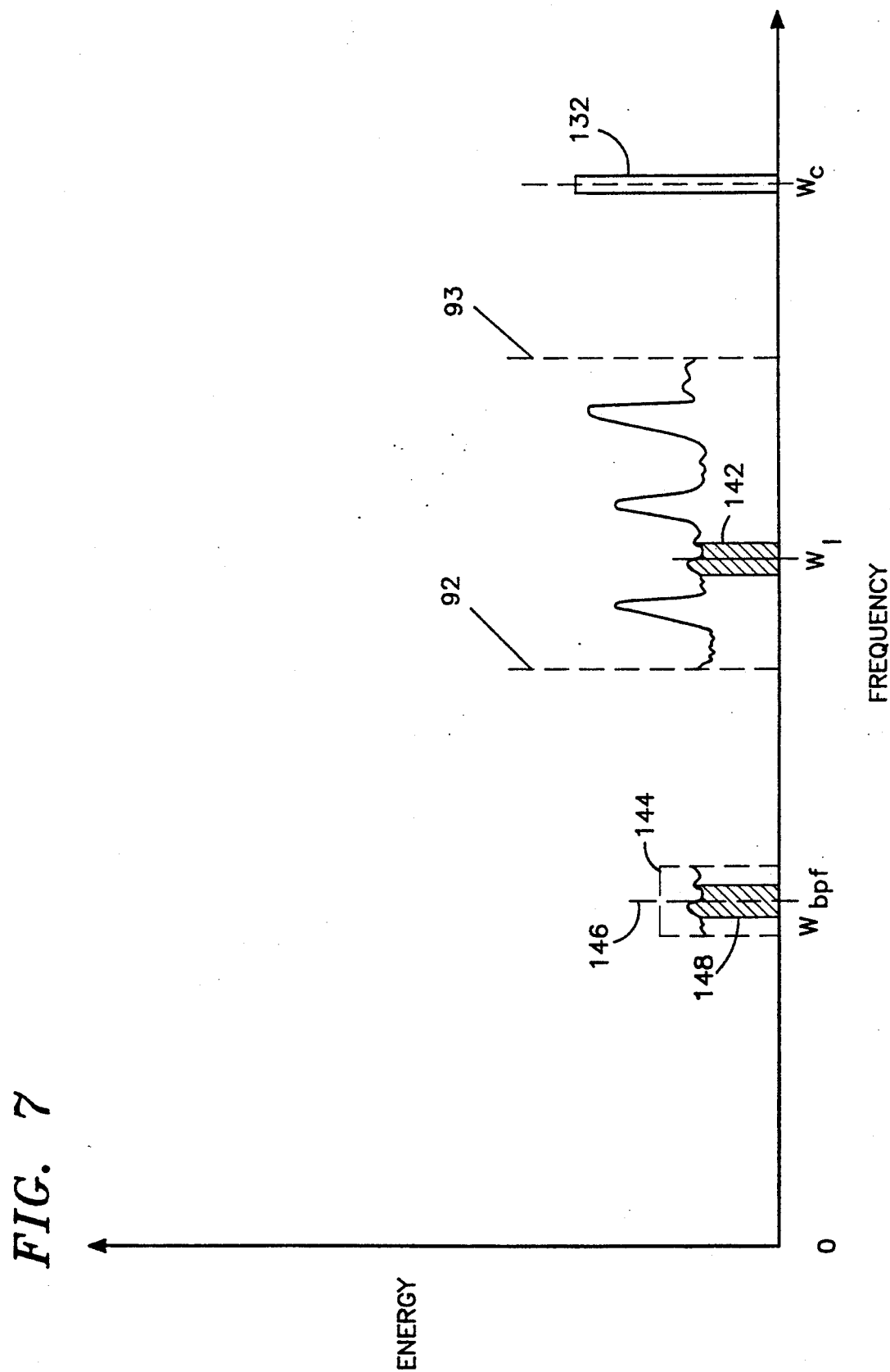
FIG. 7 is an illustration of the frequency domain relationship of a vibration frequency range of interest, a first frequency component whose energy is being determined, along with the variable frequency AC excitation signal and the pass band of the bandpass filter.

Illustrated in FIG. 7 is the frequency domain relationship between the variable frequency AC excitation signal with a single frequency component located at $w_c$ 132, and the vibration frequency range of interest between bounds 92,93. As described hereinbefore, the vibration frequency range of interest is selected based upon the current engine speed. Note, the vibration frequency range of interest illustrated in FIG. 7 is the same range as illustrated in FIG. 5. The microprocessor 86 steps through the vibration frequency range of interest by selecting different frequency components for analysis. As illustrated in FIG. 5, the frequency range of interest defined as the area between the bounds 92,93 is broken up into a plurality of N components, e.g., the microprocessor may use 100 steps to move through the vibration frequency range of interest. A first component 136, a second component 138 and an N'th component 140 of the plurality of frequency components within the vibration frequency range of interest are illustrated.

Assume a frequency component $w_1$ 142 as illustrated by a crosshatched area in FIG. 7 is the n'th of N steps through the vibration frequency range of interest. In order to measure the vibration level corresponding to the frequency component $w_1$ by the object of the present invention, the $V_{exc}$ frequency $w_c$ 132 must be selected by the microprocessor so a difference beat frequency component of interest $w_c - w_1$, created by the mixing falls within a passband 144 of the BPF.

The BPF 100 has a center frequency 146 located at $w_{bpf}$. Therefore the $V_{exc}$ frequency, $w_c$, is set by the microprocessor such that $w_c - w_1 = w_{bpf}$. This ensures the difference beat frequency component corresponding to frequency component $w_1$ 142, is bandshifted to within the passband 144 of the BPF, thereby creating a bandshifted frequency component 148. All the frequency components outside the passband of the BPF are significantly attenuated in comparison to the components within the passband. In the interest of clarity, the passband 144 of the BPF has been shown broader than may typically be designed. The narrower the passband the better the measurement granularity of the energy associated with a particular frequency component.

Figure 8:
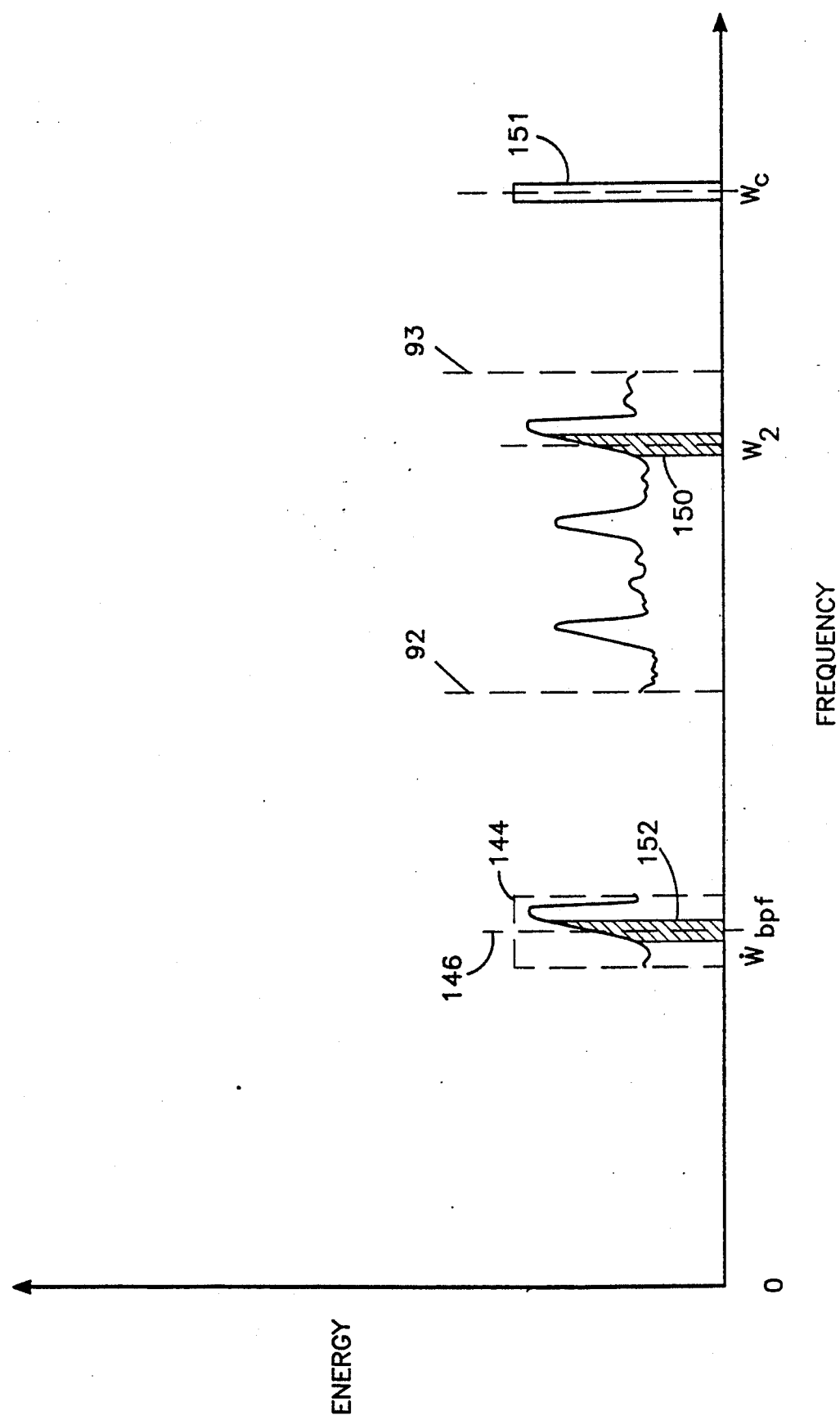
FIG. 8 is an illustration of the frequency domain relationship of the vibration frequency range of interest, a second frequency component whose energy is being determined, along with the variable frequency AC excitation signal and the pass band of the bandpass filter.

FIG. 8 illustrates the operation of the vibration monitoring system for the same vibration frequency range of interest as FIG. 7, but during a later step within the range. A second frequency component within the range, $w_2$, is illustrated as a crosshatched area 150. To measure the energy associated with the second frequency component $w_2$ the microprocessor 86 outputs a digital word on the bus 90 to the D/A 94. This digital word is chosen so the signal from the VCO 98 on the lines 52,54 is at a frequency, $w_c = w_{bpf} + w_2$. Consequently the mixing of the variable frequency AC excitation signal at a frequency $w_c = w_{bpf} + w_2$, 151 and the sensed vibration signal causes a beat frequency 152 associated with the second frequency component $w_2$ 150 to fall within the passband 144 of the BPF. The beat frequency components created by the mixing with the exception of the one corresponding to $w_2$ 150 are attenuated by the BPF. Thus the frequency spectrum of the BPF output signal on the line 102 is limited to the components about $w_{bpf}$ which include, a bandshifted frequency component whose energy is indicative of the energy associated with the second frequency component $w_2$.

The BPF filtered signal on the line 102 is then demodulated with the reference signal operating at the frequency, $w_{bpf}$. The demodulated signals on lines 114,116 are processed by the envelope detector and sampled by the A/D. The digital signal produced by the A/D is indicative of the vibration level occurring at the frequency component, e.g., $w_1$ or $w_2$.

Once the microprocessor 86 has received the sampled value from the A/D 119 indicative of the energy corresponding to the frequency component, it selects a new frequency component from within the vibration frequency range of interest for analysis. A new digital value is then output to the D/A 94 to change the frequency $w_c$ of the variable frequency AC excitation signal $V_{exc}$.

In general the microprocessor selects the vibration frequency range of interest based upon the operating speed of the engine, and steps through that frequency range by changing the frequency of the variable frequency AC excitation signal on the lines 52,54. As an example, from the vibration frequency range of interest the microprocessor may select N frequency components. Mixing the variable frequency AC excitation signal with the sensed vibration signal creates beat frequencies which then can be conveniently processed without the microprocessor performing an FFT to determine the amount of energy at different frequency components of the vibration signal.

Due to the low processor utilization necessary to support this vibration monitoring system, the CASC 32, VCO 98, BPF 100, demodulator circuitry 104, local oscillator generator 108, and envelope detector 117 can be added to a microprocessor based system already present on modern aircraft gas turbine engines, e.g., the electronic fuel control. This allows the vibration monitoring function to be performed at a relatively low cost since the microprocessor 86, A/D 119, D/A 94, F/D 89 and mux 84 are already contained in the electronic fuel control.

It should be understood that the scope of this invention is not limited to the specific circuitry illustrated for the CASC 32 and the SP 28. Rather the circuitry could be done one of several different ways too numerous to illustrate, but each of which facilitates the mixing of the sensed vibration signal and the variable frequency AC excitation signal and the subsequent signal processing to determine the energy associated with the frequency component. As an example a synchronous demodulator could be used in place of the asynchronous demodulator. The bandpass filter could be replaced with two separate filters such as a high pass and low pass filter. Furthermore, the variable frequency AC excitation signal may be selected such that the beat frequency associated with the frequency component and created by the mixing is bandshifted directly to DC. This would allow a low pass filter to be used rather than a bandpass filter. Also the present invention is not limited solely to vibration monitoring of aircraft gas turbine engines.

All the foregoing changes and variations are irrelevant to the invention, it suffices that a capacitive accelerometer senses vibration through a time varying change of capacitance and when the conductive plates between which the capacitance is measured, are excited by the variable frequency AC excitation signal, beat frequencies are produced with energy indicative of the energy associated with various frequency components within the vibration signal spectrum.

Although the present invention has been shown and described with respect to an exemplary embodiment thereof, it should be understood by those skilled in the art that various other changes, omissions and additions to the form and detail thereof, may be made therein without departing from the spirit and scope of the invention.

We claim:

1. A vibration monitoring system for determining the amount of energy at a certain frequency within a vibration signal spectrum of a mass, comprising:

capacitive accelerometer means, disposed to be mounted to or rigidly coupled to the mass, and having two or more electrically conducting surfaces separated by a dielectric material, for producing a time varying change in capacitance between said electrically conducting surfaces in response to vibration of the mass, for mixing said time varying change in capacitance and a variable frequency signal by applying said variable frequency signal which is an AC voltage across said conducting surfaces, and for providing a mixed signal indicative of the product of said mixing, such that the frequency spectrum of said mixed signal comprises a certain beat frequency whose energy is indicative of the amount of energy at the certain frequency within the vibration signal spectrum of the mass;

a bandpass filter, responsive to said mixed signal, having a passband centered about a certain center frequency, for filtering said mixed signal and for providing a filtered signal indicative thereof; and frequency control means, for providing said variable frequency signal, for setting the frequency of said variable frequency signal such that the location of said certain beat frequency created by said mixing and associated with the certain frequency of the vibration signal spectrum is within said passband, and being responsive to said filtered signal for providing an energy signal whose energy is a measure of the vibration energy associated with the certain frequency.

2. The system of claim 1, wherein:

said capacitive accelerometer means comprises three conductive plates, a first one of said plates being disposed to move as a function of the vibration of the mass, a second one of said plates being disposed in a fixed position on one side of and parallel to said first plate, a third one of said plates being disposed in a fixed position on a side of and parallel to said first plate opposite to said second plate, a first current flowing through said first plate and said second plate, a second current flowing through said third plate and said first plate, a movement of said first plate caused by a vibration of the mass changing the capacitance between said first plate and said second and third plates, the change of capacitance causing a change in value of each of said first and second currents, said first current and said second current being summed at said first plate into said mixed signal.

3. The system of claim 2, further comprising:

signal conditioning means, for providing said first and second currents as a function of said variable frequency signal.

4. The system of claim 3, wherein:

said signal conditioning means comprises a transformer having a primary coil excited by said variable frequency signal, and having a secondary coil for providing said first and second currents.

5. The system of claim 1, wherein:

said frequency control means comprises means for setting the frequency of said variable frequency signal equal to the sum of said certain center frequency and the frequency of said selected frequency component.

6. The system of claim 1, wherein:

said frequency control means comprises means for determining the frequency of said variable frequency signal based on the operating condition of the mass, and apriori knowledge of the vibration characteristics of the mass.

7. The system of claim 1, wherein:

said frequency control means comprises means for determining a vibration frequency range of interest based on apriori knowledge of the vibration characteristics of the mass and the current operating condition of the mass, said frequency component being within said vibration frequency range of interest.

8. The system of claim 7, wherein:

the current operating condition of the mass comprises information about engine speed.

9. The system of claim 1, wherein:

said bandpass filter attenuates all frequency components except a difference beat frequency term associated with said frequency component, where said mixed signal comprises said difference beat frequency term.

10. The system of claim 1, wherein said frequency control means further comprises:

a frequency to digital converter, for digitizing a frequency signal indicative of the present operating condition of the mass and for producing a digitized frequency signal indicative thereof;

signal processing means, for determining a vibration frequency range of interest in response to said digitized frequency signal, for selecting said frequency component from within said vibration frequency range of interest of the mass, and for providing a digital command signal indicative of said frequency component;

a digital to analog converter, for converting said digital command signal to a analog command signal; and a voltage controlled oscillator, responsive to said analog command signal, for providing said variable frequency signal at a frequency indicative of said analog command signal.

11. The system of claim 10, wherein said frequency control means further comprises:

a demodulator, for demodulating said filtered signal with a reference signal operating at said certain center frequency, and for providing a demodulated signal indicative thereof;

sampler means, for sampling said demodulated signal, and for converting said demodulated signal to a digital demodulated signal, said signal processing means comprising means for determining the frequency of said variable frequency signal, for providing a digital command signal indicative thereof, and for reading and storing said digital demodulated signal; and a digital-to-analog converter, for transforming said digital command signal to an analog command signal, said voltage controlled oscillator being operative to provide said variable frequency signal at a frequency determined by said analog command signal.

12. A vibration monitoring system for monitoring the frequency spectrum of a vibrating mass, comprising:

capacitive accelerometer means, mounted or rigidly coupled to the mass, for producing a time varying change of capacitance in response to the vibration of the mass, for providing a sensed signal indicative thereof, for mixing said sensed signal with a variable frequency signal by exciting said capacitive accelerometer means with said variable frequency signal which is an AC signal, and for providing a mixed signal indicative of the product of said mixing;

frequency control means, for selecting a frequency component from within the frequency spectrum of the vibrating mass, for determining the frequency which said variable frequency signal shall operate at based upon the frequency of said frequency component, and for providing said variable frequency signal; and signal processing means, for processing said mixed signal to attenuate the energy of frequency components other than the energy associated with said frequency component, and for providing a filtered signal whose frequency spectrum contains a dominant bandshifted frequency component with energy indicative of the energy of said frequency component.

13. The system of claim 12, wherein:
said frequency control means comprises means for controlling the location in the frequency domain of one or more beat frequencies which comprise said mixed signal by controlling the frequency of said variable frequency signal.

14. The system of claim 13, wherein:
said frequency control means comprises means for selecting the frequency of said variable frequency signal to position in the frequency spectrum of said mixed signal a particular beat frequency component whose energy is indicative of the energy of said frequency component, said dominant bandshifted frequency component comprising said particular beat frequency component.

15. The system of claim 12, wherein:
said frequency control means comprises means for stepping through the frequency spectrum of the vibrating mass by changing the frequency of said variable frequency signal to select a new frequency value for said frequency component.

16. The system of claim 12, wherein said signal processing means comprises:
a band pass filter, defined by a certain center frequency and a passband width and responsive to said mixed signal, for attenuating frequency components other than said dominant bandshifted frequency component, and for providing said filtered signal.

17. The system of claim 16, further comprising:

reference source means, for generating a sinusoidal reference signal operating at said certain center frequency; and a demodulator, for demodulating said filtered signal with said reference signal, and for providing a demodulated signal indicative thereof.

18. The system of claim 12, wherein:
said frequency control means comprises means for setting the frequency of said variable frequency signal so a particular beat frequency created by mixing said variable frequency signal and said frequency component is positioned within the frequency domain of said mixed signal, said dominant bandshifted frequency component comprising said particular beat frequency.

19. The system of claim 12, wherein:
said capacitive accelerometer means comprises three conductive plates, a first one of said plates being disposed to move as a function of the vibration of the mass, a second one of said plates being disposed in a fixed position on one side of and parallel to said first plate, a third one of said plates being disposed in a fixed position on a side of and parallel to said first plate opposite to said second plate, a first current flowing through said first plate and said second plate, a second current flowing through said third plate and said first plate, a movement of said first plate caused by a vibration of the mass changing the capacitance between said first plate and said second and third plates, the change of capacitance causing a change in value of each of said first and second currents, said first current and said second current being summed at said first plate into said mixed signal.

20. The system of claim 19, further comprising:
signal conditioner means, responsive to said variable frequency signal, for providing said first current signal and said second current signal.

21. The system of claim 12, wherein:
said frequency control means, selects said frequency component based upon the present operating condition of the mass.

22. The system of claim 12, wherein said frequency control means comprises:
a frequency-to-digital converter, for digitizing a frequency signal indicative of the present operating condition of the mass, and for producing a digitized frequency signal indicative thereof;

processor means, for determining a vibration frequency range of interest based upon said digitized frequency signal, for selecting said frequency component from within said vibration frequency range of interest, and for providing a digital command signal indicative of said frequency component;

a digital-to-analog convertor, responsive to said digital command signal, for converting said digital command signal to an analog command signal; and a voltage controlled oscillator, responsive to said analog command signal, for providing said variable frequency signal.

23. The system of claim 12, wherein said signal processing means further comprises:
a demodulator, for demodulating said filtered signal with a periodic reference signal which is operating at a frequency about said dominant bandshifted frequency component, and for providing a demodulated signal indicative thereof;

sampler means, for sampling said demodulated signal, for converting said demodulated signal to a digital demodulated signal, and for reading and storing said digital demodulated signal.

* * * * *